United States Patent Office 2,867,279
Patented Jan. 6, 1959

---

2,867,279

PROCESS AND COMPOSITIONS FOR TREATING GEOLOGICAL FORMATIONS

Thomas G. Cocks, Edwardsville, Ill., assignor to National Aluminate Corporation, Chicago, Ill., a corporation of Delaware No Drawing. Application March 18, 1957
Serial No. 646,558

20 Claims. (Cl. 166—42)

The present invention relates to a method of improving and maintaining the water permeability of geological formations. More particularly it relates to aqueous liquids suitable for use as input fluids in the secondary recovery of petroleum by water flooding.

With the ever increasing demand for petroleum and petroleum products the last few decades has given rise to a greater interest in the secondary recovery of petroleum from spent wells. Large amounts of oil are contained in reservoir rock which are generally found to be located in areas adjacent to existing oil pools that have long since been depleted of their supply of oil.

A commonly used method for recovering oil entrained in the reservoir rock located adjacent to existing oil well sites is to release the oil from its natural geological formation by process known as water flooding. The simplest form of this process consists of forcing water through the oil bearing reservoir rock so that it moves the oil contained therein forward into the pockets of existing wells.

In order to place the water used in the operations into the oil bearing strata it is generally the practice to pump it under pressure into a number of wells in a given area and allow it to be forced into the oil bearing formation. These wells into which the water is pumped are known as input wells. The wells from which the free oil is collected and recovered are known as producing wells. In conducting water flood operations of this type thorough consideration must be given to the variables of a given operation such as the pore size, permeability and porosity of the openings in the strata through which the water is to be pumped as well as the density and surface tension of the oil contained therein. The composition of the oil bearing strata as well as the type of water present therein is extremely important in determining the extent of success that will be achieved.

Experience has shown that the water forced into the formation through the input wells must be of a type whereby it does not plug the formation and preferably, it should be so composed that its passage through the formation will tend to improve the permeability thereof. As a general rule, the water used in the treating of reservoir rock in water flood operations must be chemically and mechanically treated to render it suitable for such use. If raw well water is used, it is generally filtered, coagulated and treated with chemicals to render it noncorrosive as well as to remove or stabilize any hardness present. In many instances, water is recirculated through the entire system, the produced oil separated and the water is reused in the flooding of the formation. As in the case of well water, such recovered water must be treated to render it suitable for use in the subsequent input operation.

The water most suitable for use in a given water flood operation is generally comparable in make-up to the water contained in the oil producing strata. This water contained in the oil bearing strata is generally referred to as connate water and contains large amounts of carbon dioxide which makes it acidic. It is desirable to take the water placed in the input well and treat it with acidic materials such as hydrochloric or sulfuric acid to lower the pH whereby it corresponds to the pH of the connate water of the oil bearing strata. This particular operation, however, has the disadvantage of requiring a close and careful check being kept on the process of pH adjustment since if too much acid is added to the input water the pH falls to an abnormally low point and the water is rendered unsuitable for use in the water flooding process. In a similar fashion, if the water contains too many heavy metal ions, e. g. Ba, Si, Fe, etc., they tend to form insoluble precipitates in the formations which tends to decrease the permeability thereof. Many of the metal ions that are believed to plug and clog the oil bearing strata are found in the formation itself. It is desirable, therefore, to provide a treatment whereby such metal ions are impeded in their plugging tendencies as well as a treatment which will not only impede the plugging of such formations but will also uniformly improve the porosity and permeability thereof.

It was discovered that certain hydroxy substituted carboxylic acids, when used in relatively small amounts, were capable of improving the permeability of geological formations. These acids are those having calcium salts which are soluble in water to the extent of at least 500 parts per million and having a dissociation constant ($K_1$) of from $2 \times 10^{-3}$ to $1 \times 10^{-5}$. Examples of such acids are malic, tartaric, citric, gluconic, lactic and salicylic. The preferred acids of this group are the hydroxy substituted polycarboxylic acids with the most effective acid in this particular group being citric. The method of using these acids in improving the water permeability of geological formations is the subject of my application Serial No. 504,367, filed April 27, 1955, for the Process of Improving and Maintaining the Water Permeability of Geological Formations.

In using the above described acids under actual field conditions it was discovered that in some instances and under certain circumstances hydroxy substituted polycarboxylic acids provided a source of carbon to various types of microorganisms commonly occurring in waters used to treat geological formations. Not only does the water used as injection fluids contain harmful bacteria but also there are certain amounts of sulfate reducing type bacteria that commonly occur in underground petroleum bearing strata. It at once became evident that in those cases where bacterial growth was present it would be desirable to incorporate with the hydroxy substituted carboxylic acids a microbiocidal material which would act as a check against undesirable bacterial growth.

In water flooding operations it is a common phenomena to find the oil sands to be preferentially wetted by oil. This means that water contacting the formations so wetted will only partially remove the oil entrained therein. This means quantities of useable oil are left entrained in the formation and the rate of production is greatly diminished. It is common practice to inject into preferentially oil wetted formations certain chemicals which reverse the wettability characteristics of the formation and allow water to remove residual oil. It would be desirable if a chemical treatment were available which would not only increase the permeability of the formation without increasing the growth of microorganisms but which would also increase the amount of oil removed from such formations when they are treated with water in secondary water flood operations.

It, therefore, becomes an object of this invention to maintain geological formations and particularly the face of such formations, in a permeable condition.

It is another object to render harmless suspended and dissolved formation plugging metal ions from water used for water flooding purposes.

A further object is to maintain the pH of the water flood injection water at a point comparable to the connate waters present in the formation.

Still another object is to provide a simple medium for accomplishing the above by the use of unobjectionable chemical treatment.

Still another object is to adjust the pH of the input water used in water flood operations with a chemical which will not give radical pH fluctuations.

A further object is to provide a chemical which is readily soluble in the aqueous media used in water flooding which is high in dissolved solids.

A still further object is to provide a chemical which does not form objectionable scale or precipitates in water.

Still another object is to provide a material which will be effective at extremely low dosages.

An additional object is to furnish a chemical treatment for injection waters which will increase the permeability thereof without increasing the growth of undesirable microorganisms.

An important object is to provide a chemical treatment which will improve the permeability of the formations as well as increasing the water wettability of geological formations in contact with aqueous liquids.

An important object is to provide a chemical treatment which will accomplish all of the above mentioned objects at a low and economical dosage.

Other objects will appear hereinafter.

In accordance with the invention it has been found that the effectiveness of hydroxy substituted carboxylic acids of the type described when used to treat water used as input liquids for the secondary recovery of petroleum by water flooding, may be materially improved by combining therewith suitable bactericidal agents. This particular combination of chemical ingredients, used in the proportions and treatment ranges hereinafter described, give results not heretofore obtainable with either of the ingredients when used alone. When the combination of the hydroxy substituted carboxylic acid and biologically active chemical are placed in water used to treat geological formations at relatively low dosages, the permeability of the formation is improved and the water wettability of the formation is such that the input aqueous fluid readily makes available larger quantities of petroleum for production than heretofore have been made available by prior art methods.

In another embodiment of the invention it will be shown that a certain combination of hydroxy substituted carboxylic acids with sulfamic acid when placed in liquids used to treat geological formations will furnish a superior treatment for improving the permeability of such formations. This particular combination is also superior to either one of the separate ingredients of which it is composed.

The microbiocidal agents which are combined with the hydroxy substituted carboxylic acids are the bactericidally active basic organic nitrogen compounds having at least 1 aliphatic group of at least 6 carbon atoms in chain length. In combining the bactericidally active agent with the hydroxy substituted carboxylic acid it is desirable to use a weight ratio of from about 25:1 to about 1:3. A preferred combination of these ingredients is within the weight ratio of from about 10:1 to about 1:1.

While any bactericidally active organic nitrogen compound of the type described above may be used, it is preferred to use one or more of certain groups of these compounds of the type listed below:

A. Alkyl substituted aliphatic monoamines
B. Alkyl substituted alkylene polyamines
C. 1,2-substituted imidazolines
D. The quaternary ammonium salts of Group C
E. The acid salts of Groups A, B and C As indicated, the above compounds should contain at least 1 aliphatic group of at least 6 carbon atoms in chain length. The alkyl group will generally contain from 8 to 20 carbon atoms preferably 12-20 carbon atoms and in a most preferred embodiment 12-16 carbon atoms. In the case of the alkyl substituted alkylene polyamines the alkyl group will be of from 8 to 18 carbon atoms in chain length. The compounds described above should be soluble in water at the use concentration dosages at which they are to be employed. While water solubility is desired, the products are of such a nature that they may disperse in the aqueous media in which they are to be incorporated; such is usually sufficient. Where solubility or dispersibility becomes a problem the acid addition salts of mineral acids such as hydrochloric will materially aid in rendering particular compounds suitable for use. Another expedient that may be employed in solubilizing or dispersing these compounds is the use of cosolvents, particularly cosolvents of low molecular weight which contain 1 or more polar groups. Exemplary of such solvents are the lower monohydric and dihydric alcohols such as methanol, ethanol, isopropanol, ethylene glycol, and the well known lower aliphatic ethers such as methyl and ethyl ether.

The aliphatic monoamines may be drawn from a wide class of commercially available compounds. Such compounds as octylamine, decylamine, dodecylamine, heptadecylamine, octadecylamine, as well as the unsaturated species of these compounds may be used with good results being obtained in each instance. In addition to the primary aliphatic monoamines the secondary and tertiary amines may also be used. To render the materials more water soluble or dispersible it is desirable to use the primary aliphatic monoamines. If the secondary and tertiary amines are used it is preferable to have the secondary and tertiary alkyl substituents of lower molecular weight. Thus for example, octadecyl dimethylamine would be preferred to dioctadecyl mono ethylamine.

Examples of commercially available higher molecular weight aliphatic amines are those sold by the Armour Chemical Company under the tradename of Armeens. Such amines contain as their alkyl radical mixed alkyl groups derived from natural oils and fats. Typical amines of this type are coco monoamine, dicoco monoamine, tallow amine, hydrogenated tallow amine, soya amine, n-tetradecylamine, and n-hexadecylamine.

The alkyl substituted alkylene polyamines are well known germicides and are described in Kyrides U. S. Patent 2,246,524, the disclosure of which is incorporated herein by reference. These polyamines may be represented by the generic formula:

in the above formula, R is an alkylene radical selected from the group consisting of ethylene, propylene and trimethylene radicals. $n$ is a number from 1 to 4 and X and Y are selected from the group consisting of hydrogen and alkyl radicals containing from 8 to 18 carbon atoms and preferably from 12 to 16 carbon atoms. Typical compounds within the scope of this class are dodecyl diethylene triamine, n-hexadecyl triethylene tetramine and decyl tetradecyl diethylene triamine. Commercially available species of this broad group of compounds are the N-alkyl substituted trimethylene diamines which are sold commercially under the tradename Duomeens, by the Armour Chemical Company. Typical Duomeens are N-coco trimethylene diamine, soya trimethylene diamine and N-tallow trimethylene diamine.

The 1,2-substituted imidazolines (glyoxalidines), are heterocyclic nitrogen compounds containing 2 non-adjacent nitrogen compounds in a 5 membered ring. These compounds may be generically represented by the following group of structural formulae.

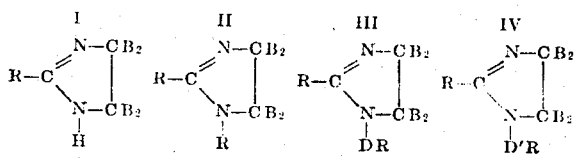

In the above D represents a divalent, organic radical containing less than 25 carbon atoms, composed of elements from the group consisting of C, H and O. D' represents a divalent organic radical containing less than 25 carbon atoms, composed of elements from the group consisting of C, H, O and N, and containing at least 1 amino group. R is a member of the class consisting of hydrogen and aliphatic and cycloaliphatic hydrocarbon radicals, with the proviso that at least 1 occurrence of R contains 8 to 32 carbon atoms. B is a member of the class consisting of hydrogen and alkyl radicals having not over 2 carbon atoms, with the proviso that at least 3 occurrences of B be hydrogen. Typical imidazolines as well as some of their acid salts are described in Luvisi Patent 2,668,100, the disclosure of which is incorporated herein by reference. Typical imidazolines that may be used in the practice of the invention are the following: 1-(2-hydroxy-ethyl)-2-undecyl glyoxalidine, 1-(2-hydroxyethyl)-2-tridecyl glyoxalidine, 1-(2-hydroxyethyl)-2-pentadecyl glyoxalidine, 1-(2-hydroxyethyl)-2-heptadecyl glyoxalidine, 1-(2-hydroxyethyl)-2-heptadecenyl glyoxalidine, 1-(2-aminoethyl)-2-undecyl glyoxalidine, 1-(2-aminoethyl)-2-tridecyl glyoxalidine, 1-(2-aminoethyl)-2-pentadecyl glyoxalidine, 1-(2-aminoethyl)-2-heptadecyl glyoxalidine, 1-(2-aminoethyl)-2-heptadecenyl glyoxalidine, 1-[(2-aminoethyl)-aminoethyl]-2-undecyl glyoxalidine, 1-[(2-aminoethyl)-aminoethyl]-2-tridecyl glyoxalidine, 1-[(2-aminoethyl)-aminoethyl]-2-pentadecyl glyoxalidine, 1-[(2-aminoethyl)-aminoethyl]-2-heptadecyl glyoxalidine, 1-[(2-aminoethyl)-aminoethyl]-2-heptadecenyl glyoxalidine, 4-methyl-2-undecyl glyoxalidine, 4-methyl-2-tridecyl glyoxalidine, 4-methyl-2-pentadecyl glyoxalidine, 4-methyl-2-heptadecyl glyoxalidine and 4-methyl-2-heptadecenyl glyoxalidine.

The quaternary ammonium salts of the 1,2-substituted imidazoline compounds are conveniently prepared by alkylating a 1,2-substituted imidazoline with an alkylating agent using any suitable preparative technique. These quaternary ammonium salts may be genericaly represented by the formula:

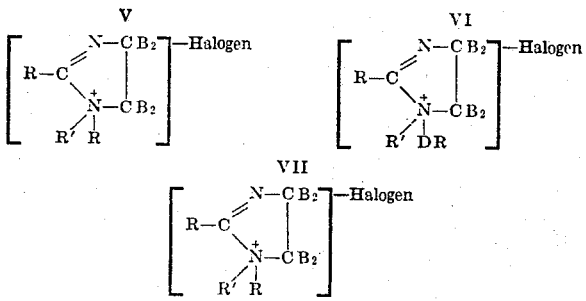

In the above D represents a divalent organic radical containing less than 25 carbon atoms, composed of elements from the group consisting of C, H and O. D' represents a divalent organic radical containing less than 25 carbon atoms, composed of elements from the group consisting of C, H, O and N, and containing at least 1 amino group; R is a member of the class consisting of hydrogen and aliphatic and cycloaliphatic hydrocarbon radicals, with the proviso that at least 1 occurrence of R contains 8 to 32 carbon atoms. R' is a member of the class consisting of aliphatic, haloaliphatic, aralkyl and halosubstituted aralkyl radicals. R' preferably contains from between 2 to not more than 12 carbon atoms. B is a member of the class consisting of hydrogen and alkyl radicals, having not over 2 carbon atoms, with the proviso that at least 3 occurrences of B be hydrogen.

A preferred class of 1,2-substituted imidazoline quaternary ammonium salts may be depicted by the following general formulae:

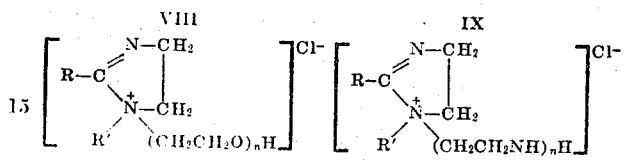

R above is an aliphatic group of at least 8 carbon atoms in chain length, R' is from the group consisting of aliphatic and halosubstituted aliphatic groups of not more than 6 carbon atoms in chain length and $n$ is a small whole number.

The imidazolines from which the quaternary ammonium compounds may be prepared are conveniently synthesized using the techniques described in Wilson U. S. Patent 2,267,965. Since the imidazolines are prepared from fatty acids with the elimination of 1 mole of water with the carboxyl group of the acid becoming a part of the heterocyclic ring, the nomenclature herein used will often times refer to the substituent on the 2 carbon atom of the imidazoline ring as being the full acid radical even though 1 carbon atom of the acid chain has been incorporated into the ring. This nomenclature is believed to simplify understanding of these compounds since it indicates the particular acid or mixture of acids from which the imidazoline or imidazolinium salt has been prepared.

As stated earlier, the quaternary ammonium salts of the 1,2-substituted imidazolines are conveniently prepared by alkylating with well knwn alkylating agents such as methyl chloride, ethyl chloride, benzyl chloride.

In a preferred embodiment the akylating agent contains halogen substituents both of which are most preferably chlorine. These alkylating agents should contain not more than 12 carbon atoms. Such alkylating agents as dichloromethane, dichlorobutane, dichloropropane chloro substituted benzylchloride are admirably suited for preparing such compounds. Several typical such compounds and their mode of preparation are listed below in Examples I through V.

EXAMPLE I 6.6 parts of trimethylene bromide were reacted with 20 parts of 1-hydroxyethyl-2-tridecyl imidazoline (derived from myristic acid and hydroxyethylethylenediamine) under the general reaction conditions previously described at temperatures within the range of 45° C. to 105° C. for a period of time not exceeding 4 hours until a water soluble product was obtained.

EXAMPLE II

The procedure described in Example I was carried out using 13.3 parts of trimethylene bromide instead of 6.6 parts.

EXAMPLE III

The procedure described in Example I was carried out using 20 parts of a 1,2-imidazoline derived by the reaction of hydroxyethylethylenediamine and coconut fatty acid and 10.6 parts of 1-chloro-2-bromopropane.

EXAMPLE IV

The reaction described in Example III was carried out using 14.3 parts of trimethylene dibromide instead of the 10.6 parts of 1-chloro-2-bromopropane.

EXAMPLE V

The process of Example III was carried out using 8.7 parts of 1,4-dichlorobutane instead of the 10.6 parts of 1-chloro-2-bromopropane.

Of all the compounds thus tested one of the most useful for use in combining with the hydroxy substituted carboxylic acids is the compound 1-[(2-hydroxyethyl) (4-chlorobutyl)]-2-tall oil imidazolinium chloride.

As already indicated it is often times desirable to prepare the acid salts of the various amines, polyamines and imidazolines to produce products which are more readily soluble and dispersible in water. Such acids that may be used in preparing the salts are hydrochloric, sulfuric, acetic, maleic, phosphoric, petroleum sulfonic acids, naphthenic acids, phenylacidic acid, benzoic acid and the like. In a preferred embodiment the hydroxy substituted carboxylic acids of the type used in the practice of this invention may be used as the salt forming acid. Since acid formation generally will take place on mere combining of the two ingredients the salt in many instances will be formed during processing steps such as will be subsequently described hereinafter.

One of the most useful acids in preparing salts of the amines, polyamines and imidazolines is sulfamic acid which in some instances will render a material only partialy dispersible in water completely soluble.

The feeding of liquid chemicals in treating input wells often presents a problem from an operational viewpoint, and it is often times desirable to use the chemicals in the form of a solid so that they may be readily introduced into the systems to be treated. Compositions of the invention may be conveniently prepared in the form of a solid by combining with the hydroxy substituted carboxylic acid and bactericidally active organic compound, a solid absorbing material which is acidic in nature and which will be soluble under conditions of use. This solid, absorptive binder material will most preferably be powdered boric acid, which is particularly suited to this invention since it is normally acidic and its alkaline earth metal salts are readily soluble in water.

In preparing solid compositions it is desirable to use a bactericidally active agent which is either a solid or semi-solid to facilitate blending and mixing. In the event the particular bactericide chosen is a liquid it is necessary to use rather large amounts of the inorganic acid binder since it is necessary to absorb all the liquid in order to insure a dry, hard solid product.

For purposes of illustration, several typical generic type solid compositions are listed below:

Composition I

Ingredients: Percent by weight
- Hydroxy substituted carboxylic acid _____ 25–75
- Acidic binder _____ 25–50
- Organic bactericide _____ 2–40

Composition II

Ingredients: Percent by weight
- Hydroxy substituted polycarboxylic acid ____ 35–60
- Boric acid _____ 20–25
- 1,2-substituted imidazolinium salt _____ 2–40

Composition I above represents a broad embodiment of a typical formula from which a solid composition may be prepared and Composition II represents a narrow and more specific type solid composition formula.

A typical solid composition in the form of small briquettes approximating the size of a peach stone, was prepared using the following ingredients.

Composition III

Ingredients: Percent by weight
- Citric acid _____ 50
- Boric acid _____ 48
- 1-[(2-hydroxyethyl) (4-chloropropal)]-2-tallow oil imidazolinium chloride _____ 2

This composition was prepared by mulling 50% of citric acid, 47% of boric acid and 3% of the imidazolinium chloride into a mulling machine where the ingredients were thoroughly mixed. This afforded an oily type composition which showed evidences of containing residual amounts of the imidazolinium chloride. Next 16.7% of citric acid and 16.7% of boric acid were further blended into this mixture and were thoroughly mulled until a homogeneous solid powder was produced. This blend which corresponded to Composition III was then briquetted under pressure to form pellets which were admirably suited for treating water flood injection wells.

While the above shows a typical formulation in its method of preparation it will be understood that the known blending or mixing techniques may be used to produce compositions containing various amounts of the ingredients. Where all of the components are solid in form the blending and mixing operation is simplified and in some instances an additional binder such as dextrin and minor amounts of water may be necessary to insure a product that may be readily pelletized for use in injection into various types of underground formations.

When formulas, such as Composition III, are prepared the blending of the hydroxy substituted polycarboxylic acid and liquid primary, secondary or tertiary amine of the types preferably used in the practice of the invention, will usually produce the hydroxy substituted polycarboxylic acid salts of these amines. By thus forming these salts the amines are rendered more water soluble and dispersible and possess properties which make them more suitable for use in treating waters used to contact geological formations than if they were used alone.

While the above gives a general mode of practicing the invention, it is to be understood that the invention is not intended to be limited by the particular type or form of the compositions used. In some instances it may be desirable to mix the ingredients separately in the particular water to be treated or the ingredients can be fed separately at different times in order to obtain maximum effectiveness under a particular given set of operating conditions. The best mode of practicing the invention will in most cases be predicated upon the particular problem involved as well as the specific nature of each individual system. Routine experimentation will enable one skilled in the art to practice the invention to obtain the maximum results.

In using hydroxy substituted carboxylic acids to increase the permeability of geological formations, it was discovered that the particular amount of acid needed was dependent upon the pH of the connate water present in the particular formation treated. It was also discovered that most formations contained waters having a relatively acidic nature and often times superior results were obtained by adjusting the pH slightly below that of the connate water. Thus for example, a formation containing water having a pH of approximately 4 could be treated with an input water containing citric acid in an amount sufficient to adjust the pH to 4, and have the permeability of the formation substantially improved. By adjusting the pH to slightly below 4 with citric acid it was discovered that even greater permeability was obtained.

In some instances where it is necessary to adjust to pH to relatively low acid values such as between 1 and 2, it was soon discovered that exceptionally good results could be obtained by blending with a hydroxy substituted carboxylic acid amounts of sulfamic acid. In a preferred embodiment the hydroxy substituted carboxylic acid is combined with the sulfamic acid in a general weight ratio of from 1:2 to 2:1. In a preferred embodiment the ratio of hydroxy substituted carboxylic acid to sulfamic acid is 1:1. The advantage of using a blend of hydroxy substituted carboxylic acid and sulfamic acid lies in the fact that the pH may be carefully adjusted without the minute manipulation of chemicals. They also have the advantage of being relatively soluble in various types of water, and for some inexplainable reason tend to increase the permeability to a greater extent than the mere acidic adjustment of such waters with strong mineral acids such as hydrochloric or sulfuric.

In using the compositions of the invention it is usually necessary to treat the particular water to be used as an injection fluid so that it contains from approximately 100 to several 1,000 parts per million of the hydroxy substituted carboxylic acid per million parts of solution, depending upon the nature of the water used as well as the characteristics and compositions of the connate water of the formation into which the input water is to be injected. In a preferred embodiment the amount of acid used will range from several hundred parts per million to approximately 500 parts per million of the water to be treated. While several hundred parts per million of the hydroxy substituted carboxylic acids are preferably added to the input water, due to further dilution and because some of the acid is lost by adsorption, the effective operational dosages believed to be around 1 to 30 parts per million of hydroxy substituted polycarboxylic acid per million parts of solution when the treated water actually contacts the interior of the formation.

In actual field use of hydroxy substituted carboxylic acids it was found that operators of water flooding operations tended to periodically slug feed the hydroxy substituted carboxylic acids to simplify the treatment procedure. By using this method it was found that towards the end of a feeding cycle the pH of the treated water would rise slightly. By using quantities of this less acidic water the growth of bacteria, particularly sulfate reducing bacteria, was noted to definitely increase. It was believed that this increase of bacterial growth was because of the pH fluctuations as well as the fact that the hydroxy substituted carboxylic acids at these particular pH ranges were a source of nutrient carbon for the bacteria. To overcome this difficulty it was found that the growth of bacteria could be materially lessened by the maintenance of a constant pH level of the input fluids used.

By incorporating a bactericidal agent of the type described above with the hydroxy substituted carboxylic acids an amazing phenomena was discovered. When the pH of the input fluid was maintained at a constant level, which also insures a relatively uniform pH rate of the formation into which it was injected, it was found that the metabolic processes of the bacteria were substantially diminished. This diminishing of the metabolic processes of the bacteria enabled relatively minute amounts of the organic bactericide to effectively mitigate and control subsequent growths of such bacteria. Thus in a typical input well, treated with an input fluid containing 1,000 parts per million of Composition III was experiencing difficulty with large amounts of sulfate reducing bacteria being present in the formation. By the time Composition III had contacted the formation only about 20 parts per million of the citric acid had contacted the formation and less than one tenth part per million of the 1,2-substituted imidazolinium salt was available for actively combating the unwanted bacterial growth. Surprising the permeability of the formation substantially increased and the amount of sulfate reducing bacteria present was greatly diminished. Normally, it would be necessary to use between 100 and 200 parts per million of the 1,2-substituted imidazolinium salt to effectively control the growth of microorganisms and such a treatment would usually have no effect whatsoever on the permeability of the formation.

When compositions, containing larger amounts of organic bactericide are used the effects achieved are striking. Not only is the porosity of the formation treated maintained and improved but the bacterial growth if any is present is greatly diminished and the water wettability of the formation is greatly improved which is evidenced by an increase in production. An additional advantage to using the combination of hydroxy substituted carboxylic acids and the organic bactericides is that a certain amount of corrosion inhibition is afforded to the various metal parts of the system contacted by the waters treated with these materials. The results obtained by using compositions of the invention are believed to be more than additive and are definitely synergistic. The multiplicity of beneficial effects obtained by practicing this invention are deemed noteworthy and a substantial increase in the production of petroleum evidences their success.

While the compositions described above are capable of use in water flood secondary recovering operations of petroleum, their use is not so limited to such applications. They are advantageously used to treat natural wells to improve the flow rate of water into and out of such wells into the surrounding geological formations. In such wells, the water pocket is generally surrounded by a porous sand formation which is normally permeable to ingress and egress of water. By adding a few parts per million of the compositions of the inventions to the well water it has been found the permeability of the adjacent strata is substantially increased and ingress and egress of the water is materially improved. If any bacteria are present in the water the growth of the bacteria is substantially diminished or completely destroyed.

The practice of the invention may also be used to treat wells used to dispose of excess produced water. Such systems are known as disposal systems. The use of the compositions described herein permits well water to be placed down a well before formation blockage occurs either due to poor porosity or due to plugging by undesirable bacterial growth.

The expression, "improving the characteristics of geological formations," is a generic term which is meant to imply that compositions may be used which not only increase the permeability of geological formations, but which also act to diminish or reduce bacterial growth, improve the water wettability of certain types of geological formations and also to inhibit the disposition of corrosion products into such formations by preventing such corrosive action which occurs due to injection fluids contacting various metals of metal equipment which it contacts before entry into such geological formations.

The expression, "microorganisms" and "bacteria" are generic terms and includes such forms of lower life as bacteria, algae, fungi and protozoa.

The expression, "biologically active" refers to those chemicals capable of acting upon microorganisms to either inhibit or prevent growth.

Having thus described my invention in all its useful and novel aspects it is claimed as follows:

1. A process of improving the characteristics of geological formations which comprises contacting said formations with water having dissolved therein a hydroxy substituted carboxylic acid and a bactericidally active basic organic nitrogen compound having at least one aliphatic group of at least 8 carbon atoms in chain length, said hydroxy substituted carboxylic acid being soluble in water at 20° C. as its calcium salt to the extent of at least 500 parts per million and having a dissociation constant $(K_1)$ of from $2 \times 10^{-3}$ to $1 \times 10^{-5}$, and the amount of said acid being sufficient to adjust the pH of said water to a range equal to or less than that of the connate water present in said formation, with the weight ratio of acid to basic organic nitrogen compound being within the range of from 25:1 to 1:3.

2. The process of claim 1 wherein the hydroxy substituted carboxylic acid is a hydroxy substituted polycarboxylic acid.

3. The process of claim 1 wherein the hydroxy substituted carboxylic acid is citric acid.

4. A process of improving the characteristics of geological formations which comprises contacting said formations with water having dissolved therein a hydroxy substituted carboxylic acid and a bactericidally active basic organic nitrogen compound from the group consisting of alkyl substituted monoamines, alkyl substituted alkylene polyamines and 1,2-substituted imidazolines and their quaternary ammonium and acid salts, said compounds having at least one alphatic group of at least 12 carbon atoms in chain length, said hydroxy substituted carboxylic acid being soluble in water at 20° C. as its calcium salt to the extent of at least 500 parts per million and having a dissociation constant ($K_1$) of from $2\times10^{-3}$ to $1\times10^{-5}$, and the amount of said acid being sufficient to adjust the pH of said water to a range equal to or less than that of the connate water present in said formation, with the weight ratio of acid to basic organic nitrogen compound being within the range of from 25:1 to 1:3.

5. The process of claim 4 wherein the hydroxy substituted carboxylic acid is a hydroxy substituted polycarboxylic acid.

6. The process of claim 4 wherein the hydroxy substituted carboxylic acid is citric acid.

7. A process of improving the characteristics of geological formations which comprises contacting said formations with water having dissolved therein a hydroxy substituted carboxylic acid and a bactericidally active amount of a compound from the group consisting of N-alkylated alkylene polyamines and salts thereof with acids, said N-alkylated alkylene polyamines corresponding to the general formula:

$$X-NH-R-(NH-R)_n-NH-Y$$

in which R is an alkylene radical selected from the group consisting of ethylene, propylene and trimethylene radicals, $n$ is a number from 0 to 4, and X and Y are selected from the group consisting of hydrogen and alkyl radicals at least one of which is an alkyl radical having from 8 to 18 carbon atoms in chain length, said hydroxy substituted carboxylic acid being soluble in water at 20° C. as its calcium salt to the extent of at least 500 parts per million and having a dissociation constant ($K_1$) of from $2\times10^{-3}$ to $1\times10^{-5}$, and the amount of said acid being sufficient to adjust the pH of said water to that of the connate water present in said formation.

8. The process of claim 7 wherein the hydroxy substituted carboxylic acid is a hydroxy substituted polycarboxylic acid and the N-alkylated alkylene polyamine is an N-alkyl substituted trimethylene diamine having an alkyl group of at least 8 carbon atoms in chain length.

9. The process of claim 7 wherein the hydroxy substituted carboxylic acid is citric acid and the N-alkylated alkylene polyamine is N-coco trimethylene diamine.

10. A process of improving the characteristics of geological formations which comprises contacting said formations with water having dissolved therein a hydroxy substituted carboxylic acid and a bactericidally active amount of a 1,2-substituted imidazolinium salt of the formula from the group consisting of:

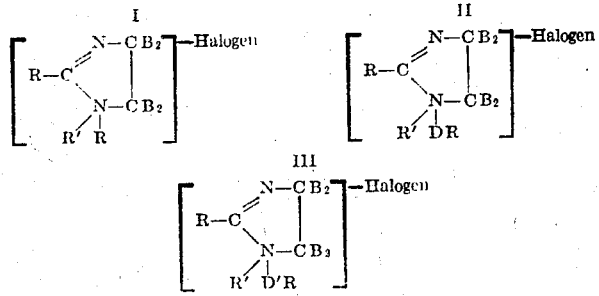

in which D represents a divalent, organic radical containing less than 25 carbon atoms, composed of elements from the group consisting of C, H and O; D' represents a divalent organic radical containing less than 25 carbon atoms, composed of elements from the group consisting of C, H, O and N, and containing at least one amino group; R is a member of the class consisting of hydrogen and aliphatic and cycloaliphatic hydrocarbon radicals; with the proviso that at least one occurrence of R contains 8 to 32 carbon atoms; R' is a member of the class consisting of aliphatic, haloaliphatic, aralkyl and halosubstituted aralkyl radicals; and B is a member of the class consisting of hydrogen and alkyl radicals; having not over two carbon atoms, with the proviso that at least 3 occurrences of B be hydrogen, said hydroxy substituted carboxylic acid being soluble in water at 20° C. as its calcium salt to the extent of at least 500 parts per million and having a dissociation constant ($K_1$) of from $2\times10^{-3}$ to $1\times10^{-5}$, and the amount of said acid being sufficient to adjust the pH of said water to a range equal to or less than that of the connate water present in said formation.

11. The process of claim 10 wherein the hydroxy substituted carboxylic acid is a hydroxy substituted polycarboxylic acid and the 1,2-substituted imidazolinium salt is of the formula from the group consisting of:

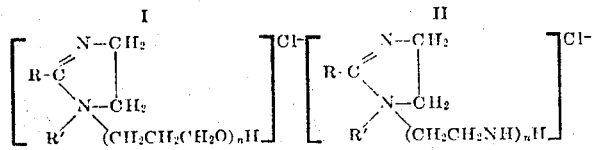

wherein R is an aliphatic group of at least 8 carbon atoms in chain length, R' is from the group consisting of aliphatic and halosubstituted aliphatic groups of not more than 6 carbon atoms in chain length and $n$ is a small whole number.

12. The process of claim 10 wherein the hydroxy substituted carboxylic acid is citric acid and the 1,2-substituted imidazolinium salt is 1-[(2-hydroxyethyl) (4-chlorobutyl)]-2 tall oil imidazolinium chloride.

13. A solid composition useful in treating water injected into geological formations comprising:

| Ingredients: | Percent by weight |
|---|---|
| A. Citric acid | 35–60 |
| B. Boric acid | 20–50 |
| C. 1-[(2-hydroxyethyl) (4-chlorobutyl)]-2-tall oil imidazolinium chloride | 2–40 |

14. A solid composition useful in treating water injected into geological formations comprising a hydroxy substituted carboxylic acid and sulfamic acid, said hydroxy substituted carboxylic acid being soluble in water at 20° C. as its calcium salt to the extent of at least 500 parts per million and having a dissociation constant ($K_1$) of from $2\times10^{-3}$ to $1\times10^{-5}$, with the weight ratio of hydroxy substituted carboxylic acid to sulfamic acid being within the range of 1:2 to 2:1.

15. The composition of claim 14 wherein the hydroxy substituted carboxylic acid is a hydroxy substituted polycarboxylic acid.

16. The composition of claim 14 wherein the hydroxy substituted carboxylic acid is citric acid.

17. A solid composition useful in treating water injected into geological formations comprising:

| Ingredients: | Percent by weight |
|---|---|
| A. A hydroxy substituted carboxylic acid which is soluble in water at 20° C. as its calcium salt to the extent of at least 500 parts per million and having a dissociation constant ($K_1$) of from $2\times10^{-3}$ to $1\times10^{-5}$ | 25–75 |
| B. Boric acid | 25–50 |
| C. Bactericidally active basic organic nitrogen compound from the group consisting of alkyl substituted alkylene polyamines and 1,2-substituted imidazolines and their quaternary ammonium and acid salts, said compounds having at least one aliphatic group of at least 12 carbon atoms in chain length | 2–40 |

18. An acidic treating liquid which comprises water containing a composition comprising a hydroxy substituted carboxylic acid and sulfamic acid, said hydroxy substituted carboxylic acid being soluble in water at 20° C. as its calcium salt to the extent of at least 500 parts per million and having a dissociation constant ($K_1$) of from $2 \times 10^{-3}$ to $1 \times 10^{-5}$, with the weight ratio of hydroxy substituted carboxylic acid to sulfamic being within the range of 1:2 to 2:1.

19. The acidic treating liquid of claim 18 wherein the hydroxy substituted carboxylic acid is a hydroxy substituted polycarboxylic acid.

20. The acidic treating liquid of claim 18 wherein the hydroxy substituted carboxylic acid is citric acd.

References Cited in the file of this patent

UNITED STATES PATENTS

| | | |
|---|---|---|
| 2,238,930 | Chamberlain et al. | Apr. 22, 1941 |
| 2,246,726 | Garrison | June 24, 1941 |
| 2,692,231 | Stayner et al. | Oct. 19, 1954 |
| 2,759,975 | Chiddix et al. | Aug. 21, 1956 |